(No Model.) 7 Sheets—Sheet 1.
H. AIKEN.
CHARGING CRANE.

No. 489,779. Patented Jan. 10, 1893.

WITNESSES
INVENTOR

(No Model.) 7 Sheets—Sheet 2.

H. AIKEN.
CHARGING CRANE.

No. 489,779. Patented Jan. 10, 1893.

WITNESSES

INVENTOR
Henry Aiken
by W. Bakewell & Sons
his Attorneys (No Model.) 7 Sheets—Sheet 3.

H. AIKEN.
CHARGING CRANE.

No. 489,779. Patented Jan. 10, 1893.

WITNESSES

INVENTOR
Henry Aiken
by W. Bakewell & Sons
his Attorneys.

(No Model.) 7 Sheets—Sheet 4.

H. AIKEN.
CHARGING CRANE.

No. 489,779. Patented Jan. 10, 1893.

Fig. 6.

WITNESSES

INVENTOR
Henry Aiken
by W. Bakewell & Sons
his Attorneys (No Model.) 7 Sheets—Sheet 5.

H. AIKEN.
CHARGING CRANE.

No. 489,779. Patented Jan. 10, 1893.

WITNESSES
INVENTOR (No Model.) 7 Sheets—Sheet 6.
H. AIKEN.
CHARGING CRANE.

No. 489,779. Patented Jan. 10, 1893.

Fig. 9.

WITNESSES

INVENTOR

UNITED STATES PATENT OFFICE.

HENRY AIKEN, OF PITTSBURG, PENNSYLVANIA.

CHARGING-CRANE.

SPECIFICATION forming part of Letters Patent No. 489,779, dated January 10, 1893.

Application filed May 25, 1891. Serial No. 393,956. (No model.)

*To all whom it may concern:*

Be it known that I, HENRY AIKEN, of Pittsburg, in the county of Allegheny and State of Pennsylvania, have invented a new and useful Improvement in Charging-Cranes, of which the following is a full, clear, and exact description, reference being had to the accompanying drawings, forming part of this specification, in which—

Like symbols of reference indicate like parts in each of the figures.

The use for which I have especially devised my improved crane is in charging cupola furnaces for melting cast iron, in which the charging door is situate at some elevation above the floor level, but it may be employed for any other purpose to which its structure makes it applicable.

Figure 1:
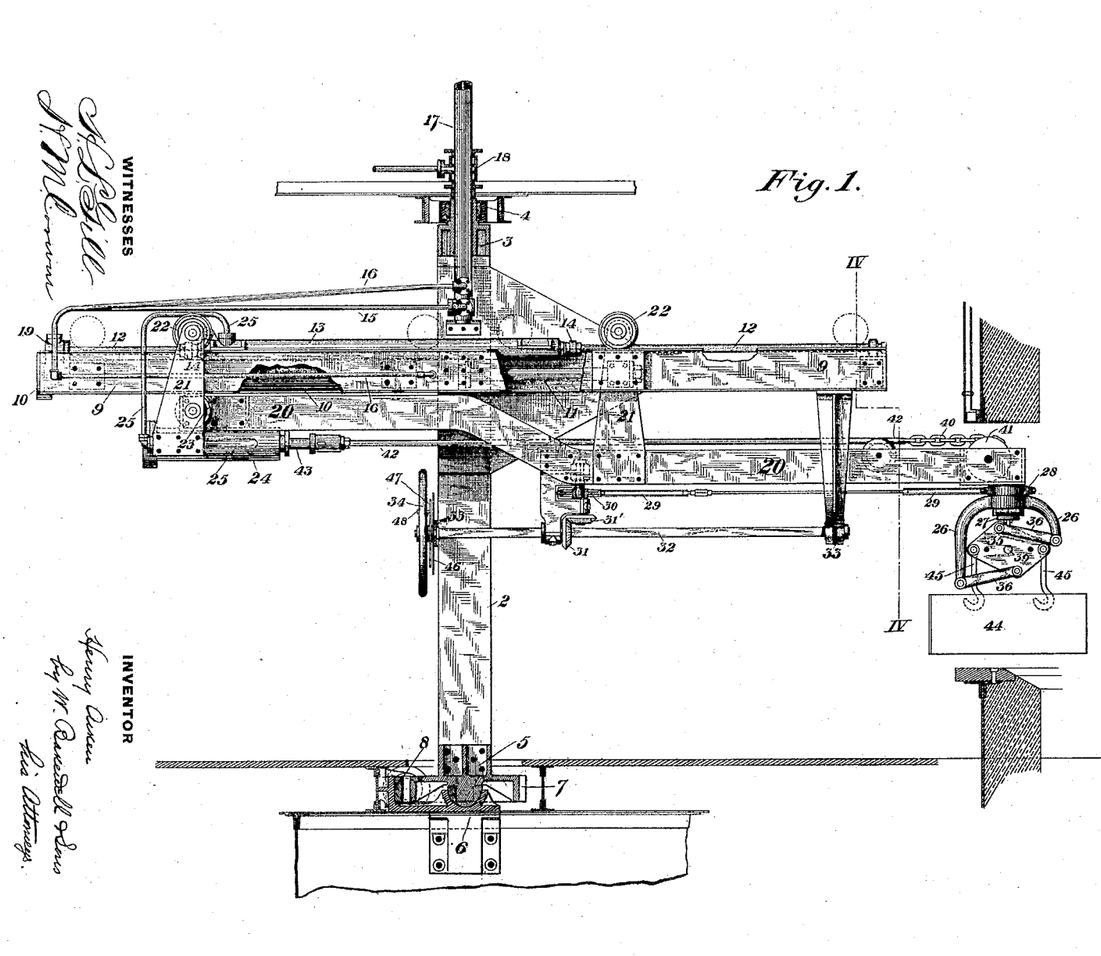
Figure 1 is a side elevation, partly in vertical section, of my improved furnace-charging crane.

In the drawings, 2 represents the crane-mast, composed of upright metal beams, secured at the top to a journal-block 3, which has its bearing in a top steadiment 4, and at the base secured to a journal-block 5, journaled in a suitable step 6 and provided with means, such as a rack and pinion 7, 8, for rotating the crane. The jib 9 is shown as composed of parallel channel beams fixed to the mast and extending horizontally therefrom in both directions. A hydraulic cylinder 10 is supported horizontally between the beams of the jib and is provided with a projecting plunger 11, and above the same are parallel water-conducting pipes 12, extending from end to end of the jib and fixed thereto. Surrounding these pipes are wider and shorter pipes 13, provided with stuffing-boxes 14, so that they may be moved longitudinally from end to end of the inner pipes, and the latter are provided at the middle with lateral holes, so that communication between the pipes is maintained in whatever position they may be. Water is supplied to the pipes 12 and to the cylinder 10 by four pipes 15, 16, leading from the channels of a vertical pipe 17 which extends through the top journal of the crane, and derives its water from encircling boxes 18, constructed and arranged as described in my prior patent No. 455,650, of July 7, 1891. The pipes 16, one only of which is shown in Fig. 1, enters the cylinder 10 at the front and rear ends respectively, and the pipes 15 are coupled to boxes 19 at the rear of the jib into which the pipes 12 are screwed.

Below the jib 9 is a carriage 20 composed of parallel beams supported by brackets 21 having wheels 22, which bear on the top of the jib-beams, and provided at the rear with wheels 23, which bear on the under side of the jib. At the rear end of the carriage 20 and supported thereby or by the brackets 21 is an hydraulic cylinder 24, having water-supply pipes 25 entering the rear and front ends thereof and leading from the water pipes 13. The latter pipes are connected to the brackets 21 and are thus moved therewith longitudinally, forming telescopic water connections for the cylinder 24. The carriage 20 is moved longitudinally on the jib by the cylinder 10, the plunger 11 of which is connected to one of the brackets 21 at the middle of the carriage. At the end of the carriage is a support in the form of a yoke 26 which is pivotally mounted on a vertical downwardly-projecting stem 27, so as to be rotatory thereon, and at the top of said yoke is chain-wheel 28 keyed to a collar on the yoke so as to be rotatory therewith. The chain-wheel and yoke are rotated on their vertical axis by an endless chain 29, passing around the chain-wheel 28 at one end, and at the other end around a chain-wheel 30, which by gearing 31, 31', is connected with a shaft 32. This shaft has its bearing in brackets 33, one of which is supported by the jib and the other of which is carried by the crane-mast. The shaft 32 and the hub of the encircling gearing 31 are squared to constitute a traveling connection as shown, so that by rotating a hand-wheel 34, the shaft may be turned, and through the gearing 31 the chainwheel and chain may rotate the yoke 26, no matter in what position the carriage may be.

Figures 2, 3:
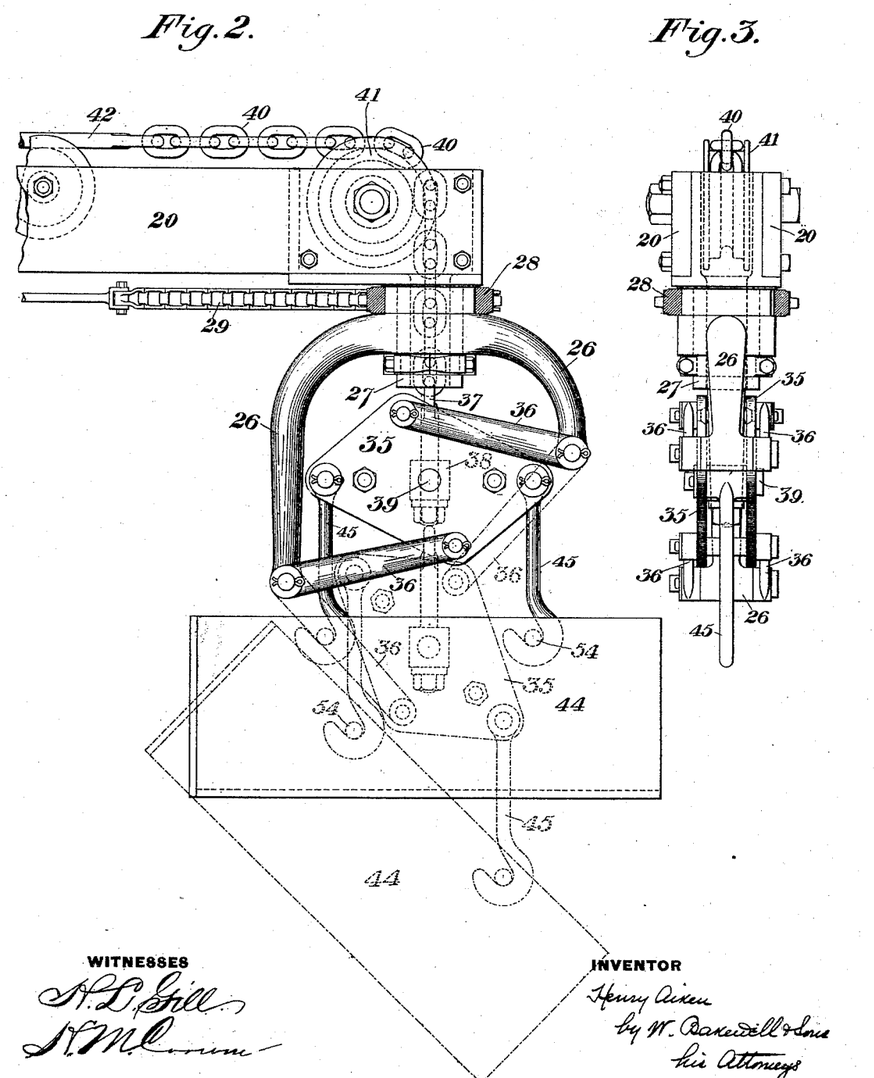
Fig. 2 is a side elevation on a larger scale, showing the end of the jib, the box supported thereby for carrying the burden, and its operating mechanism.
Fig. 3 is an end view of Fig. 2.
Figure 4:
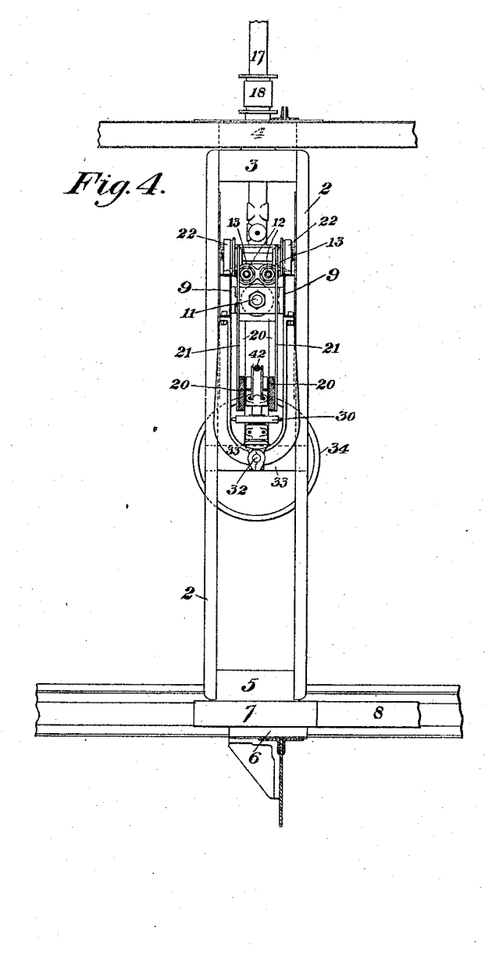
Fig. 4 is a vertical section on the line IV—IV of Fig. 1.
Figure 5:
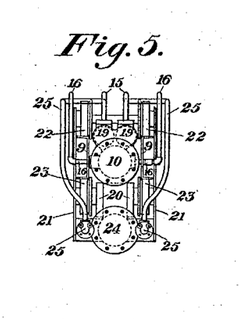
Fig. 5 is a rear end view of the jib.

Below the yoke 26 is a compound lever 35, preferably constituted by two parallel rigidly connected plates as shown in Fig. 3. This lever is pivotally connected at opposite points with the ends of the yoke 26 by arms 36, and is also supported by a hanger-bar 37, the lower end of which is vertically swiveled in a block 38, set between the plates of the lever 35 and pivoted thereto by horizontal trunnions 39. The hanger-bar 37 is attached to the end of a chain 40, which passes up through the post 27 over a sheave 41 on the carriage and is connected by a rod 42 with the plunger 43 of the cylinder 24.

44 is the box for carrying the furnace charge. The box shown in Fig. 2 being used for carrying pig iron is preferably open at the end, so that when horizontal it is adapted to hold the charge and that when tipped into the inclined position shown in Fig. 2 by dotted lines, it may discharge the same. The box is adapted to be upheld from the lever 35 by means of hooks 45, depending from the latter as shown.

The operation is as follows:—When the parts are in the position shown by Fig. 1 and it is desired to introduce a charge of metal into the furnace, the crane is rotated so as to bring the hooks 45 to a car at which a box 44 containing the charge is suspended on said hooks. The crane is then rotated so as to bring the box opposite to the charging door of the furnace, and by admitting water into the cylinder 10, its plunger is projected so as to advance the carriage along the jib and to introduce the box 44 into the door. Then, in order to discharge the contents of the box, water is admitted to the rear end of the cylinder 24 so as to project its plunger and to permit the lever 35 and box 44, which are suspended by the chain 40, to descend. The effect of such downward motion is, by action of the arms 36, to cause the lever to turn on the trunnions 39 and to tip the box 44 into the downwardly inclined position shown by dotted lines in Fig. 2, and to discharge the contents into the furnace. Before thus tipping the box, it may be turned horizontally to stand at any angle within the furnace, by turning the hand-wheel 34, and thus by means of the intermediate mechanism, rotating the yoke 26. After the contents of the box have been discharged it may be restored to its original position by retracting the plunger of the cylinder 24 and then withdrawing the carriage by admitting water into the front of the cylinder 10 and exhausting it from the rear thereof. The valves by which the several motors are thus operated may be situate at any convenient place in the line of the water pipes.

Figure 7:
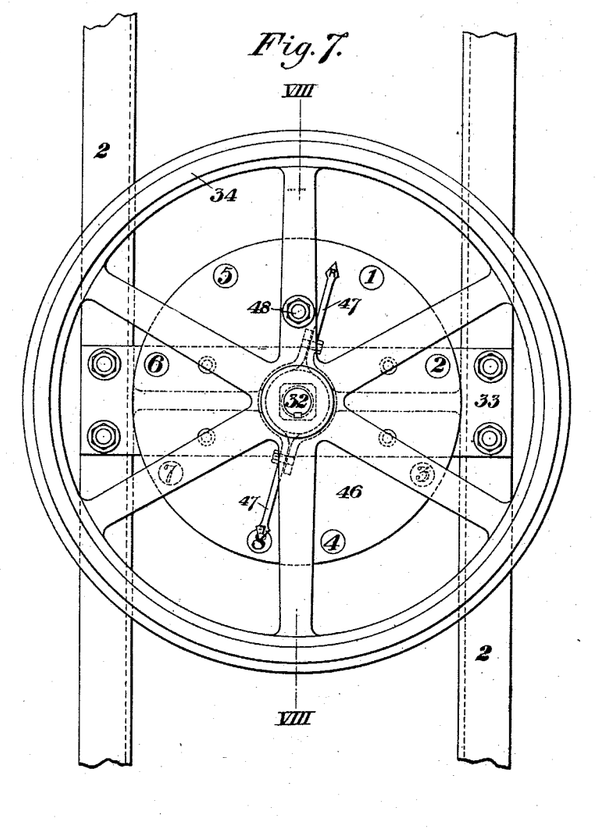
Fig. 7 shows in elevation the hand-wheel for turning the box and the index for showing its position.
Figure 8:
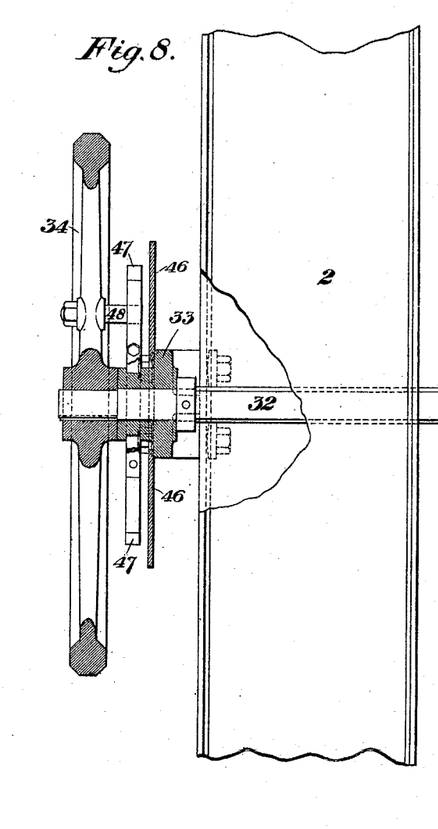
Fig. 8 is a vertical section on the line VIII—VIII of Fig. 7.

In Figs. 1, 7 and 8, I show a convenient means for directing the workman in distributing the charge evenly within the furnace.

Referring to Figs. 7 and 8, 46 is a dial fixed to the bearing 33 and is provided with dividing marks or numbers arranged as shown in Fig. 7, in which there are eight divisions, arranged as follows:—1, 2, 3, 4, 8, 7, 6, 5. A pointer 47 is clamped on the bearing with sufficient firmness to oppose some resistance to being moved, but not so tightly as to prevent it being turned thereon by a pin 48, which projects from the hand-wheel 34.

Figure 9:
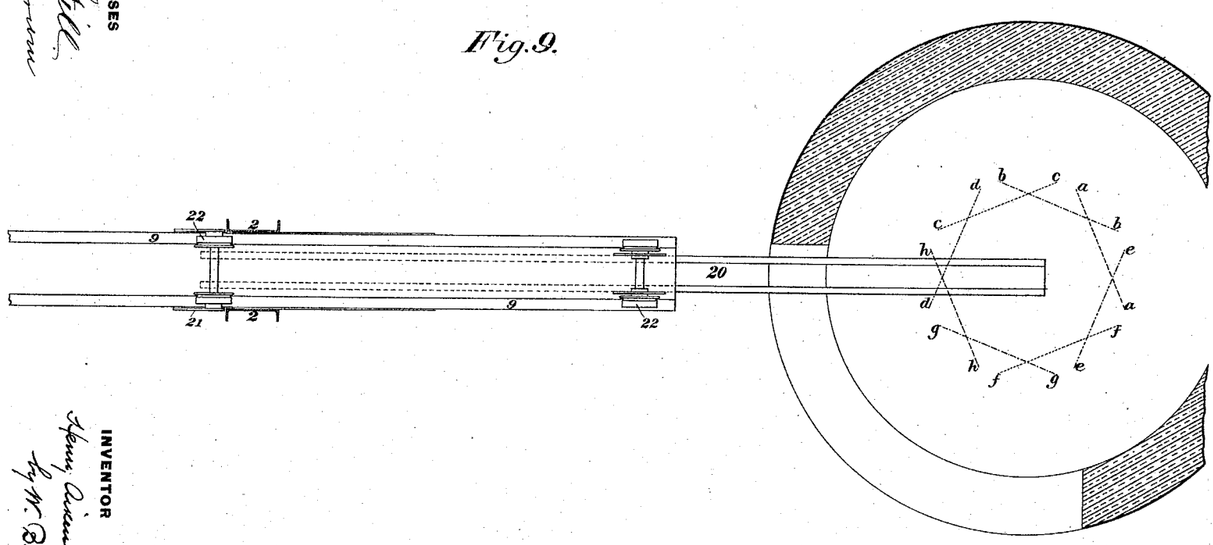
Fig. 9 is a diagram plan view, illustrating the mode of distributing the charge in the furnace.

Fig. 7 shows the parts in the positions that they occupy when the box is first introduced into the furnace. Now in order to bring the box so that its front line shall be in the position indicated by the line $a\,a$ in Fig. 9, the operator turns the wheel 34 to the right until the end R of the pointer is carried thereby opposite to the figure 1 on the dial, and then dumps the box. Then, in order to straighten the box preparatory to withdrawing it from the furnace, the operator moves back the wheel to the position shown in Fig. 1, leaving the pointer standing opposite to the figure 1 on the dial. When the next box is introduced into the furnace, the operator, before dumping the box, moves the wheel until the pointer comes opposite to the figure 2, when the front line of the box will be in the position shown by the dotted lines $b\,b$. The wheel is then moved back to its original position, leaving the pointer at the figure 2. At the next two introductions of the box into the furnace, the wheel is moved to bring the pointer successively opposite the figures 3 and 4, turning the box successively into the positions indicated by the lines $c\,c$ and $d\,d$. At the end of the fourth dumping operation, the box will have been turned to the full extent permitted by the actuating gearing shown in Fig. 1. At the fifth dumping, the operator, instead of turning the wheel to the right, turns it to the left, thus carrying the end L of the pointer, (which then is between the figures 5 and 1) opposite to the figure 5. The box being then in the position indicated by the line $e\,e$ is dumped, and the wheel turned back to its original position. At the next three introductions of the box, the wheel is turned successively to the left to carry the end L of the pointer opposite to the figures 5, 6 and 7, thus turning the box in succession into the positions represented by the lines $f\,f$, $g\,g$, and $h\,h$. The charges are thus delivered at successive points around the interior of the furnace, and are distributed therein uniformly. The advantage of reversing the operation of the wheel as described above, is that after the fourth dumping, the wheel in being turned back to its normal position, does not have to be moved through so large an arc as would be necessary if the turning in one direction were continued to the end of the full revolution. It should be understood, however, that my invention is not limited in this regard, and that the form and mechanical construction of the registering device may be varied in many ways.

Figure 6:
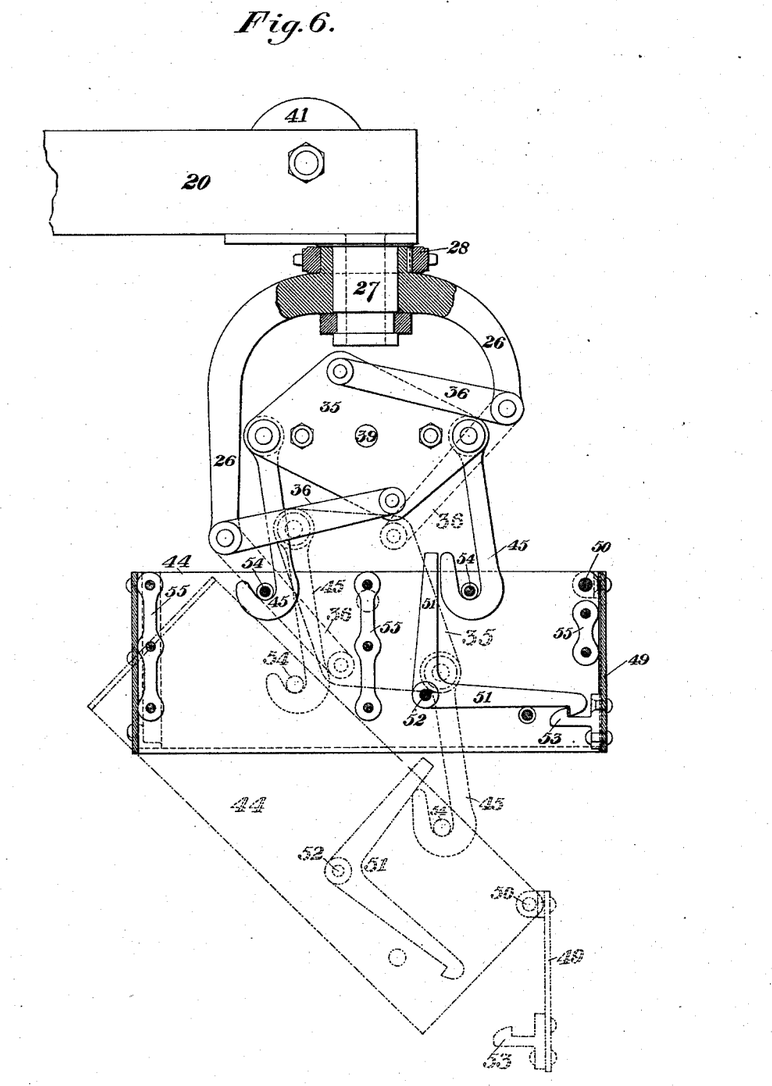
Fig. 6 is a view similar to Fig. 2, showing a charging box of modified construction, which is the form of box claimed specifically herein, the box being shown in vertical longitudinal section on the line VI—VI of Fig. 10.
Figure 10:
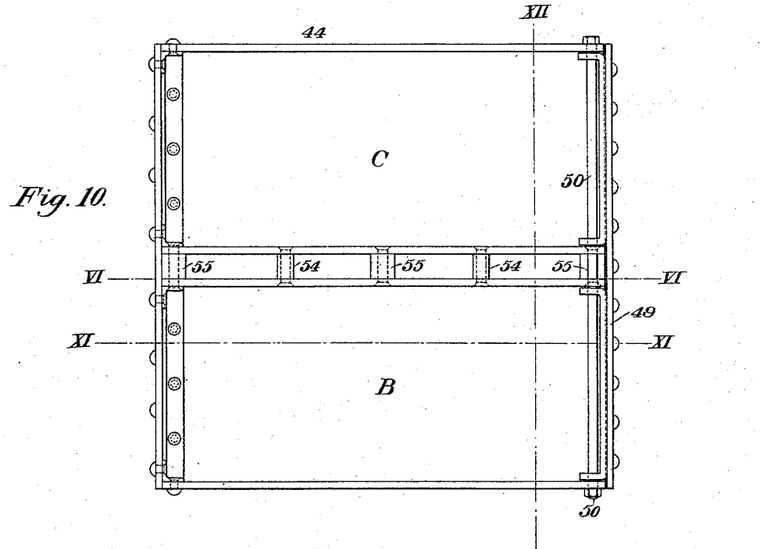
Fig. 10 is a plan view of one of the boxes used for holding the material to be charged into the furnace.

In Figs. 6 and 10 I show a form of box especially adapted for use in charging into the furnace coke or other materials occurring in similar loose pieces, such as lime. For such purpose, it is desirable that the box should be provided with an end door or doors and with means for opening the same to discharge the contents. The box of Fig. 6 has an end door 49 pivoted at the top to a rod 50, and adapted to be held in closed position by an elbow-lever or trigger 51, pivoted at 52, and having a hooked end adapted to engage a hooked lug 53 on the door. One of the hooks 45 by which the box is upheld is shaped so that its end shall be nearly in contact with the upright arm of the elbow-lever, as shown by full lines in Fig. 6. When the box is tipped into an inclined position to discharge its contents, the said arm engages the hook and the lever is tripped thereby so as to release the door and to permit it to open as shown by dotted lines.

Figure 11:
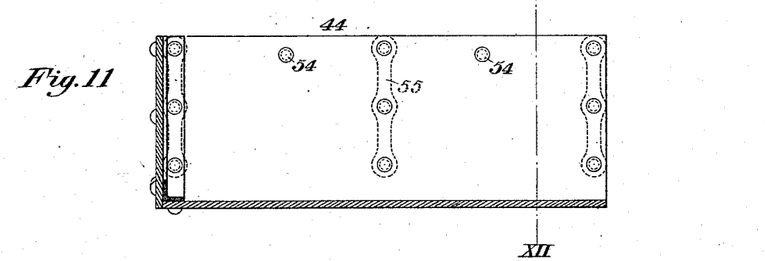
Fig. 11 is a vertical longitudinal section on the line XI—XI of Fig. 10.
Figure 12:
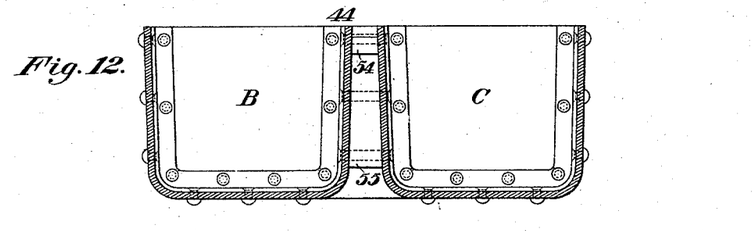
Fig. 12 is a vertical cross section on the line XII—XII of Figs. 10 and 11.

The preferable details of construction of the box are clearly shown in Figs. 10, 11 and 12. The box is made of two compartments B and C, set side by side, and connected by cross studs 54 and separators 55, so as to afford an intervening vertical space, the hooks 45 being adapted to be engaged with the studs between the compartments. The said space serves as a guide for the hooks 45, which being inserted therein will be hooked automatically on moving the parts of the charging apparatus before explained. It also serves to receive a ridge which is preferably formed on the body of the car carrying the boxes, and which holds and steadies the boxes in place thereon. The bearing of the hooks at the sides of said intermediate space also steadies the box when suspended, and prevents it from tipping laterally when one of the compartments is charged more heavily than the other, and because the suspending studs are in the middle and not at the outer sides of the box they will not afford projections which by liability to catch on other objects would be detrimental. To engage the hooks with the box, the yoke 26 may be turned as above described, so as to bring the hooks above the space between the compartments. The box itself need not be turned.

I believe I am the first to devise a crane for charging furnaces, adapted to carry into the furnace a box containing the materials to be charged and to tilt the box forwardly to discharge the same; and the first also to provide means for turning a charging box in the furnace to effect a proper distribution of the materials. The advantages of these features and of the other parts of the apparatus will be appreciated by those skilled in the art.

The device is simple in construction, rapid in its work, it is easily controlled, and is the means of saving much of the labor required by the usual operations of hand-charging.

I claim as my invention:—

1. In furnace-charging apparatus, the combination of a carrier, and a support carried pivotally by the carrier and adapted to uphold the charge, said support being rotatory within the furnace independently of the carrier on a vertical axis to distribute the charge in the furnace, and said carrier being constructed and adapted to enter the furnace door to bring the pivotal axis of the support within the furnace-door; substantially as and for the purposes described.

2. In furnace-charging apparatus, the combination of a carrier, and a support carried pivotally by the carrier and adapted to uphold the charge, said support being rotatory within the furnace independently of the carrier on a vertical axis to distribute the charge in the furnace, and mechanism for rotating said support, said carrier being constructed and adapted to enter the furnace-door to bring the pivotal axis of the support within the furnace-door; substantially as and for the purposes described.

3. In furnace-charging apparatus, the combination of a carrier, a longitudinally-tipping support carried pivotally by the carrier and adapted to uphold the charge, said support being rotatory within the furnace independently of the carrier on a vertical axis to distribute the charge in the furnace, mechanism for rotating and mechanism for tipping said support, said carrier being constructed and adapted to enter the furnace-door to bring the pivotal axis of the support within the furnace-door; substantially as and for the purposes described.

4. In furnace-charging apparatus, the combination of a carrier adapted to enter the furnace, a box carried thereby and rotatory on a vertical axis independently of the carrier, and two suspending devices connected with the box, one of said suspending devices being movable vertically relatively to the other, whereby the box may be tipped; substantially as and for the purposes described.

5. In furnace-charging apparatus, the combination of a carrier adapted to enter the furnace, a box carried thereby and rotatory on a vertical axis independently of the carrier, two suspending devices connected with the box, one of said suspending devices being movable vertically relatively to the other, whereby the box may be tipped, and a hydraulic cylinder connected with the suspending devices and adapted to operate the same; substantially as and for the purposes described.

6. In furnace-charging apparatus, the combination with a carrier adapted to enter the furnace, of a support adapted to uphold and distribute the charge, mechanism for shifting the position of the same in the furnace, and an index adapted to denote the position of the box; substantially as and for the purposes described.

7. In furnace-charging apparatus, the combination with a carrier adapted to enter the furnace, of a yoke upheld thereby, a lever connected with the yoke by arms and adapted to uphold a charging box, and means for moving said lever vertically; substantially as and for the purposes described.

8. In furnace-charging apparatus, the combination with a carrier adapted to enter the furnace, of a yoke rotatory on a vertical axis on the carrier, a lever connected with the yoke by arms and adapted to uphold a charging box, and a chain passing through the journal of the yoke and movable to actuate the lever; substantially as and for the purposes described.

9. In furnace-charging apparatus, the combination with a carrier adapted to enter the furnace, of a yoke upheld thereby, a lever connected with the yoke by arms and adapted to uphold the charging box, means for moving said lever vertically and a chain connected with the yoke and adapted to rotate it; substantially as and for the purposes described.

10. A charge-supporting box having a door, a latch for holding the same, and suspending hooks, said latch being arranged in juxtaposition to one of the hooks and adapted to engage the same and to be tripped when the box is tilted; substantially as and for the purposes described.

11. In furnace-charging apparatus, the combination with a carrier adapted to enter the furnace, of a rotatory support adapted to uphold and distribute the charge, a wheel for rotating the same, a dial, and an index adapted to be engaged and moved by the wheel to indicate the position of the box; substantially as and for the purposes described.

12. In furnace-charging apparatus, the combination with a carrier adapted to enter the furnace, of a rotatory support adapted to distribute the charge, a dial having divisions in two reversely arranged series, and an index having oppositely projecting portions adapted to be engaged and moved on rotation of said support; substantially as and for the purposes described.

13. A charge-supporting box formed with two separated compartments, having intermediate studs situate below the top of the compartments, and adapted to be engaged by a suspending device; substantially as and for the purposes described.

14. In furnace-charging apparatus, the combination of a carrier adapted to enter a furnace-door, a support carried by the carrier and mounted pivotally on a vertical axis, mechanism adapted to rotate the support on its vertical axis, and mechanism adapted to tip the same; substantially as and for the purpose described.

In testimony whereof I have hereunto set my hand this 20th day of May, A. D. 1891.

HENRY AIKEN.

Witnesses:
T. W. BAKEWELL,
H. M. CORWIN.